US012803384B2

(12) United States Patent
Oechslen et al.

(10) Patent No.: US 12,803,384 B2
(45) Date of Patent: Nov. 17, 2026

(54) DRIVE UNIT WITH ELECTRIC MOTOR, EXPANSION TANK AND PRESSURE EQUALIZATION

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 216 days.

(21) Appl. No.: 18/321,804

(22) Filed: May 23, 2023

(65) Prior Publication Data

US 2023/0387753 A1 Nov. 30, 2023

(30) Foreign Application Priority Data

May 30, 2022 (DE) ......................... 102022113565.9

(51) Int. Cl.
*H02K 9/193* (2006.01)
*B60K 11/02* (2006.01)
(Continued)

(52) U.S. Cl.
CPC ............. *H02K 9/193* (2013.01); *H02K 5/203* (2021.01); *H02K 9/26* (2013.01); *B60K 11/02* (2013.01)

(58) Field of Classification Search
CPC ........... H02K 9/193; H02K 5/203; H02K 9/26
See application file for complete search history.

(56) References Cited

U.S. PATENT DOCUMENTS 5,031,579 A 7/1991 Evans
11,588,379 B2 2/2023 Steinz et al.
(Continued)

FOREIGN PATENT DOCUMENTS

CN 112350517 A 2/2021
DE 102005032633 A1 1/2007
(Continued)

OTHER PUBLICATIONS

Engelhardt (DE 102017112365 A1) English Translation (Year: 2018).*
(Continued)

*Primary Examiner* — Tulsidas C Patel
*Assistant Examiner* — Robert E Mates
(74) *Attorney, Agent, or Firm* — LEYDIG, VOIT & MAYER, LTD.

(57) ABSTRACT

A drive unit for an electric vehicle including an electric motor, with a stator assembly and rotor assembly, and a cooling system. The stator assembly includes a housing, a stator core having grooves, and a winding assembly. The winding assembly extends through the grooves. The housing includes a housing inlet and outlet connected the grooves. The cooling system includes a first cooling circuit connected to the housing inlet and outlet to enable direct cooling of the winding assembly. The first cooling circuit includes an expansion tank assembly including an expansion tank, at least one inlet, one outlet, and a pressure equalization assembly. The expansion tank is connected to the first cooling circuit via the at least one inlet and the outlet. The pressure equalization assembly enables a connection between the expansion tank and an ambient environment to cause a pressure equalization between the expansion tank and ambient environment.

19 Claims, 3 Drawing Sheets

(51) Int. Cl.
*H02K 5/20* (2006.01)
*H02K 9/26* (2006.01)

(56) References Cited

U.S. PATENT DOCUMENTS

| | | | | |
|---|---|---|---|---|
| 2002/0112678 | A1 | 8/2002 | Langervik | |
| 2007/0199443 | A1* | 8/2007 | Viereck | B01D 53/261 96/111 |
| 2009/0179509 | A1 | 7/2009 | Gerundt et al. | |
| 2009/0277401 | A1 | 11/2009 | Theorell | |
| 2011/0200954 | A1* | 8/2011 | Sassow | C05F 11/00 431/2 |
| 2020/0106343 | A1* | 4/2020 | Okuhata | H02K 9/19 |
| 2021/0006132 | A1* | 1/2021 | Steinz | F16H 57/0417 |

FOREIGN PATENT DOCUMENTS

| | | | | | |
|---|---|---|---|---|---|
| DE | 102013213002 | A1 | * | 1/2015 | H02K 9/19 |
| DE | 102013019687 | B3 | | 3/2015 | |
| DE | 102015109690 | A1 | * | 12/2016 | |
| DE | 102017112365 | A1 | * | 12/2018 | |
| DE | 102019117637 | A1 | | 1/2021 | |
| DE | 102019126914 | A1 | | 4/2021 | |
| EP | 3184336 | A1 | | 6/2017 | |
| JP | S60140885 | A | | 7/1985 | |
| JP | H05504806 | A | | 7/1993 | |
| JP | 2000220992 | A | | 8/2000 | |
| JP | 2003070199 | A | | 3/2003 | |
| JP | 2009544885 | A | | 12/2009 | |
| JP | 2014113934 | A | | 6/2014 | |
| JP | 2016147577 | A | | 8/2016 | |
| JP | 2021024447 | A | * | 2/2021 | H02K 9/19 |
| WO | WO 2019182622 | A1 | | 9/2019 | |
| WO | WO 2020234036 | A1 | | 11/2020 | |

OTHER PUBLICATIONS

Kuecuekyavuz (DE 102013213002 A1) English Translation (Year: 2015).*
Krueger (DE 102015109690 A1) English Translation (Year: 2016).*
Bessho (JP2021024447 (A)) English Translation (Year: 2021).*

* cited by examiner

DRIVE UNIT WITH ELECTRIC MOTOR, EXPANSION TANK AND PRESSURE EQUALIZATION

CROSS REFERENCE TO RELATED APPLICATIONS

This application claims benefit to German Patent Application No. DE 10 2022 113 565.9, filed on May 30, 2022, which is hereby incorporated by reference herein.

FIELD

The invention relates to a drive unit and an electric vehicle.

BACKGROUND

DE 10 2013 019 687 B3 discloses a cooling system for a hybrid vehicle comprising an oil circuit and a water cooling circuit.

EP 3 184 336 A1 discloses a cooling system for an electric vehicle having an electric motor, an inverter, and a transmission in which the inverter and electric motor are cooled by means of a first oil circuit.

WO 2019/182 622 A1 discloses a cooling system for an electric vehicle comprising a glycol-water cooling circuit and an oil circuit.

DE 10 2005 032 633 A1 discloses a cooling system for an electromechanical component and a transmission with cooling done by a transmission oil.

SUMMARY

In an embodiment, the present disclosure provides a drive unit for an electric vehicle, comprising an electric motor for propulsion and a cooling system. The electric motor comprises a stator assembly and a rotor assembly. The stator assembly comprises a stator housing, a stator core having grooves, and a winding assembly. The winding assembly extends through the grooves. The stator housing comprises a stator housing inlet and a stator housing outlet. The grooves are fluidically connected to the stator housing inlet and the stator housing outlet. The cooling system comprises a first cooling circuit, which is connected to the stator housing inlet and the stator housing outlet so as to enable a direct cooling of the winding assembly. The first cooling circuit comprises an expansion tank assembly, the expansion tank assembly comprising an expansion tank, at least one expansion tank inlet, one expansion tank outlet, and a pressure equalization assembly. The expansion tank is connected to the first cooling circuit via the at least one expansion tank inlet and the expansion tank outlet. The pressure equalization assembly is configured to enable, at least temporarily, a fluidic connection between the expansion tank and an ambient environment of the drive unit, in order to at least partially cause a pressure equalization between the expansion tank and the ambient environment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
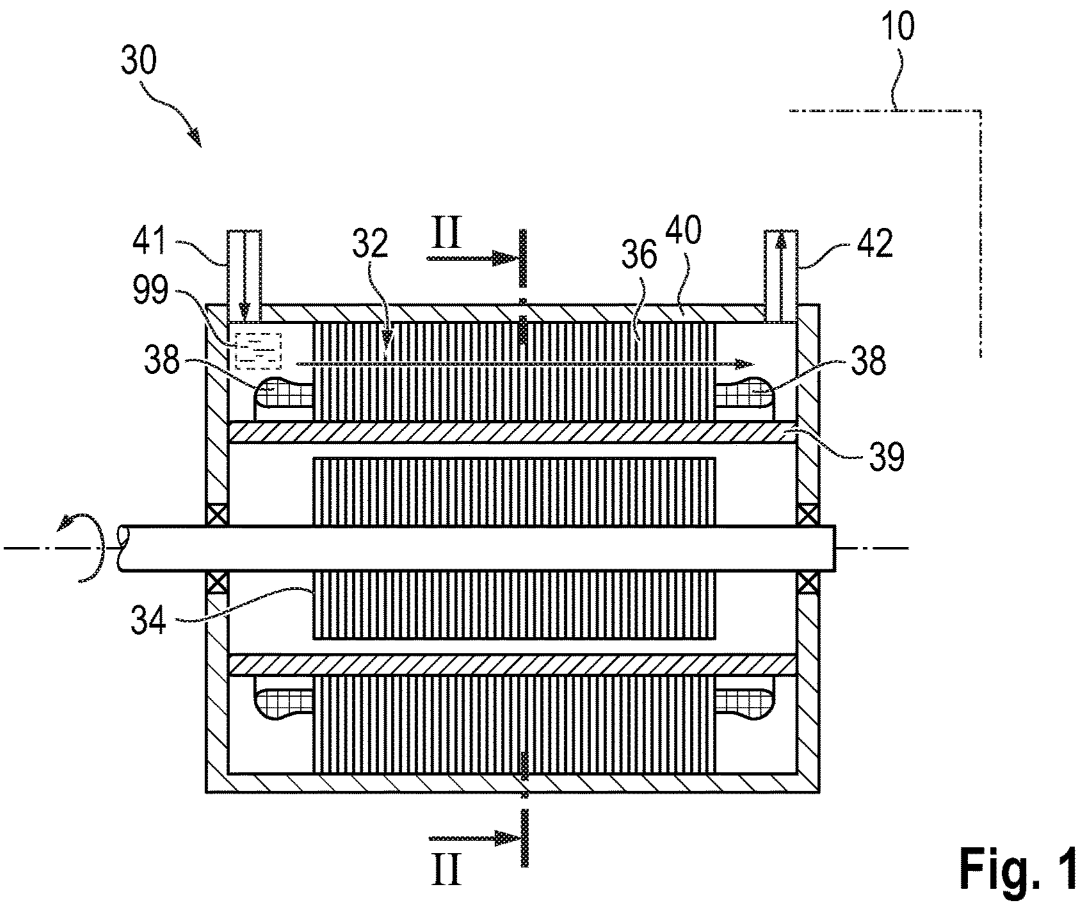
FIG. 1 is a schematic longitudinal section of an electric motor.

In an embodiment, the present invention provides a new drive unit and a new electric vehicle.

A drive unit for an electric vehicle comprises an electric motor for drive and a cooling system, which electric motor comprises a stator assembly and a rotor assembly, which stator assembly comprises a stator housing, a stator core having grooves, and a winding assembly, which winding assembly extends through the grooves, which stator housing comprises a stator housing inlet and a stator housing outlet, which grooves are fluidically connected to the stator housing inlet and the stator housing outlet, which cooling system comprises a first cooling circuit, which is connected to the stator housing inlet and the stator housing outlet so as to enable a direct cooling of the winding assembly, and which first cooling circuit comprises an expansion tank assembly, which expansion tank assembly comprises an expansion tank, at least one expansion tank inlet, at least one expansion tank outlet, and a pressure equalization assembly, which expansion tank is connected to the first cooling circuit via the at least one expansion tank inlet and the expansion tank outlet, which pressure equalization assembly is configured so as to enable at least temporarily a fluidic connection between the expansion tank and the ambient environment of the drive unit, in order to at least partially cause a pressure equalization between the expansion tank and the ambient environment.

The provision of the pressure equalization assembly allows for a restriction of the pressure occurring in the first cooling circuit, and the elements of the cooling circuit can be designed for lower maximum pressures and thus also more easily and cost-effectively. This can be referred to as an open or partially open cooling circuit.

According to an embodiment, the stator assembly is configured as an outer stator assembly and the rotor assembly is configured as an inner rotor assembly. A direct cooling is particularly advantageous.

According to an embodiment, the pressure equalization assembly is configured so as to cause the pressure equalization as a function of the differential pressure between the expansion tank and the ambient environment.

According to an embodiment, the first cooling circuit comprises a first coolant. Coolant allows for good cooling, and it is preferably a fluid, particularly a liquid fluid.

According to an embodiment, the first coolant is a dielectric coolant. Dielectric coolants are particularly well-suited for cooling a winding assembly, and, due to the temperature-dependent volume expansion of dielectric coolants, the expansion tank assembly is particularly advantageous.

According to an embodiment, the pressure equalization assembly comprises a first filter apparatus, which first filter apparatus is configured so as to reduce a discharge of the coolant into the ambient environment. This leads to better environmental friendliness of the entire drive unit.

According to an embodiment, the first filter apparatus comprises an activated carbon filter. Activated carbon filters are particularly well-suited for retaining the coolant and only allowing the air to pass through.

According to an embodiment, the pressure equalization assembly comprises a first valve, which is configured so as to transition from a non-conductive state into a conductive state when the pressure in the expansion tank is greater than the pressure in the ambient environment by at least a specified first amount in order to at least partially cause the pressure equalization in case of a positive pressure in the expansion tank. Thus, there must be a differential pressure with the first amount, which first amount is not equal to zero. Preferably, the first valve closes again when the differential pressure exceeds a further specified value in terms of amount. In other words, the first valve transitions from the conductive into the non-conductive state when the pressure equalization has taken place or the differential pressure has dropped below a specified threshold due to the pressure equalization. The switch between the non-conductive state and the conductive state can occur with or without hysteresis.

According to an embodiment, the first valve comprises a first spring, and the specified first amount is influenced by the spring force of the first spring. This allows for a simple configuration of a pressure relief valve.

According to an embodiment, the pressure equalization assembly comprises a second valve, which is configured so as to transition from a non-conductive state into a conductive state when the pressure in the ambient environment is greater than the pressure in the expansion tank by at least a specified second amount in order to at least partially cause a pressure equalization in case of a negative pressure in the expansion tank. Thus, with a corresponding differential pressure with the second amount, which second amount is not equal to zero, a pressure equalization takes place, but preferably not to a pressure difference of zero. Preferably, the second valve closes again when the differential pressure exceeds a further specified value in terms of amount. In other words, the second valve transitions from the conductive into the non-conductive state when the pressure equalization has taken place or the differential pressure has dropped below a specified threshold due to the pressure equalization. The switch between the non-conductive state and the conductive state can occur with or without hysteresis.

The first valve and the second valve can be configured as separate valves or as a common valve, which allows for both functions.

According to an embodiment, the second valve comprises a second spring, and the specified second amount is influenced by the spring force of the second spring.

According to an embodiment, the pressure equalization assembly comprises a dehumidification apparatus, which dehumidification apparatus is configured so as to perform a dehumidification of air entering the expansion tank from the ambient environment.

According to an embodiment, the pressure equalization assembly comprises a second filter apparatus, which second filter apparatus is configured so as to reduce or prevent an entry of dirt through air entering the expansion tank from the ambient environment.

According to an embodiment, the drive unit comprises a second cooling circuit and a pumping apparatus, which pumping apparatus comprises a first pump and a second pump, which first pump is configured so as to convey a first coolant in the first cooling circuit, and which second pump is configured so as to convey a second coolant in the second cooling circuit, which first coolant and which second coolant are different. The provision of different coolants allows for an optimized cooling of different apparatuses.

According to an embodiment, the pumping apparatus is configured so as to propel the first pump and the second pump by a common pump drive, for example by an additional electric motor provided for this purpose.

According to an embodiment, the drive unit comprises a third cooling circuit, the first cooling circuit comprises a first heat exchanger, the second cooling circuit comprises a second heat exchanger, and the third cooling circuit is configured so as to cool the first heat exchanger and the second heat exchanger. This multiple use provides an improved overall concept and allows for a reduction in overall weight.

An electric vehicle comprises such a drive unit. The drive unit is particularly well suited for vehicle, because the safety of the overall drive unit is comparatively high.

Further details and advantageous further developments of embodiments of the invention will emerge from the embodiment examples, which are described below and illustrated in the drawings and are not to be construed as limiting the invention in any way. It goes without saying that the features mentioned above and those yet to be discussed below can be used not only in the respectively specified combination, but also in other combinations or on their own, without leaving the scope of the present invention.

Parts that are the same or have the same effect bear the same reference numbers in the following and are generally described only once. The descriptions of all of the figures build on one another in order to avoid unnecessary repetitions.

FIG. 1 shows an electric motor 30 for the drive of an electric vehicle 10. Such an electric motor 30 is also referred to as a drive motor, and can preferably additionally operate as generators.

The electric motor 30 has a stator assembly 32 and a rotor assembly 34. The stator assembly 32 has a stator housing 40, a collimator 39, a stator core 36, and a winding assembly 38.

The stator core 36 is typically configured as a sheet package.

Only the winding heads on the two axial sides of the stator core 36 are visible in the winding assembly 38 in the illustration.

The stator housing 40 has a stator housing inlet 41 and a stator housing outlet 42 via which the electric motor 30 can be connected to a coolant circuit. Schematically, a coolant 99 is drawn in.

Figure 2:
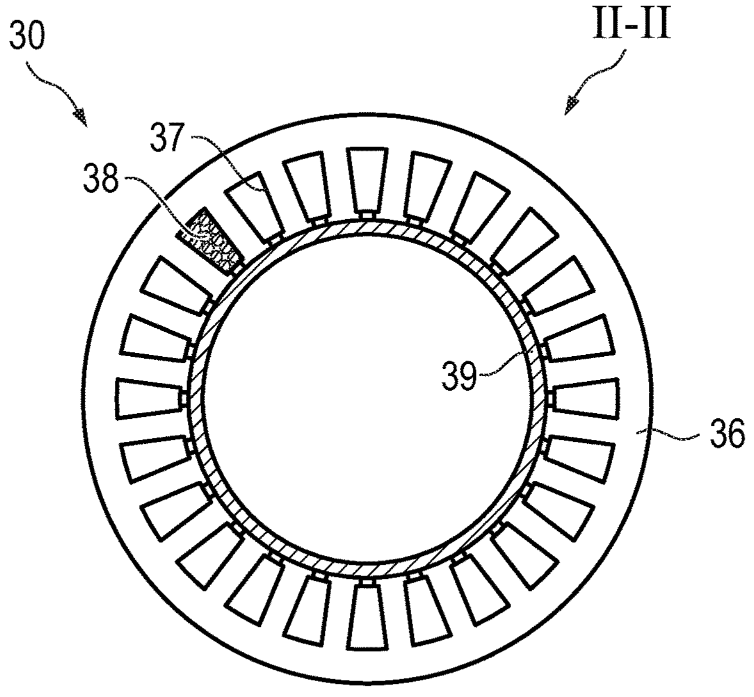
FIG. 2 is a schematic transverse section of a stator assembly of the electric motor of FIG. 1.

FIG. 2 shows the electric motor 30 of FIG. 1 in a transverse section along line II-II of FIG. 1.

The stator core 36 has grooves 37 through which the winding assembly 38 extends, indicated schematically in a groove 37. Preferably, the collimator 39 is provided on the radially inner side of the stator core 36 in order to provide a seal against the inner rotor 34 (cf. FIG. 1). The grooves 37 are fluidically connected to both the stator housing inlet 41 and the stator housing outlet 42. This allows the coolant 99 of FIG. 1 to flow through the grooves 37 and cool the winding assembly 38 well. This is also referred to as direct cooling of the winding assembly 38. The coolant 99 flows in the grooves directly along the wires of the winding assembly 38 and cools them extensively.

Figure 3:
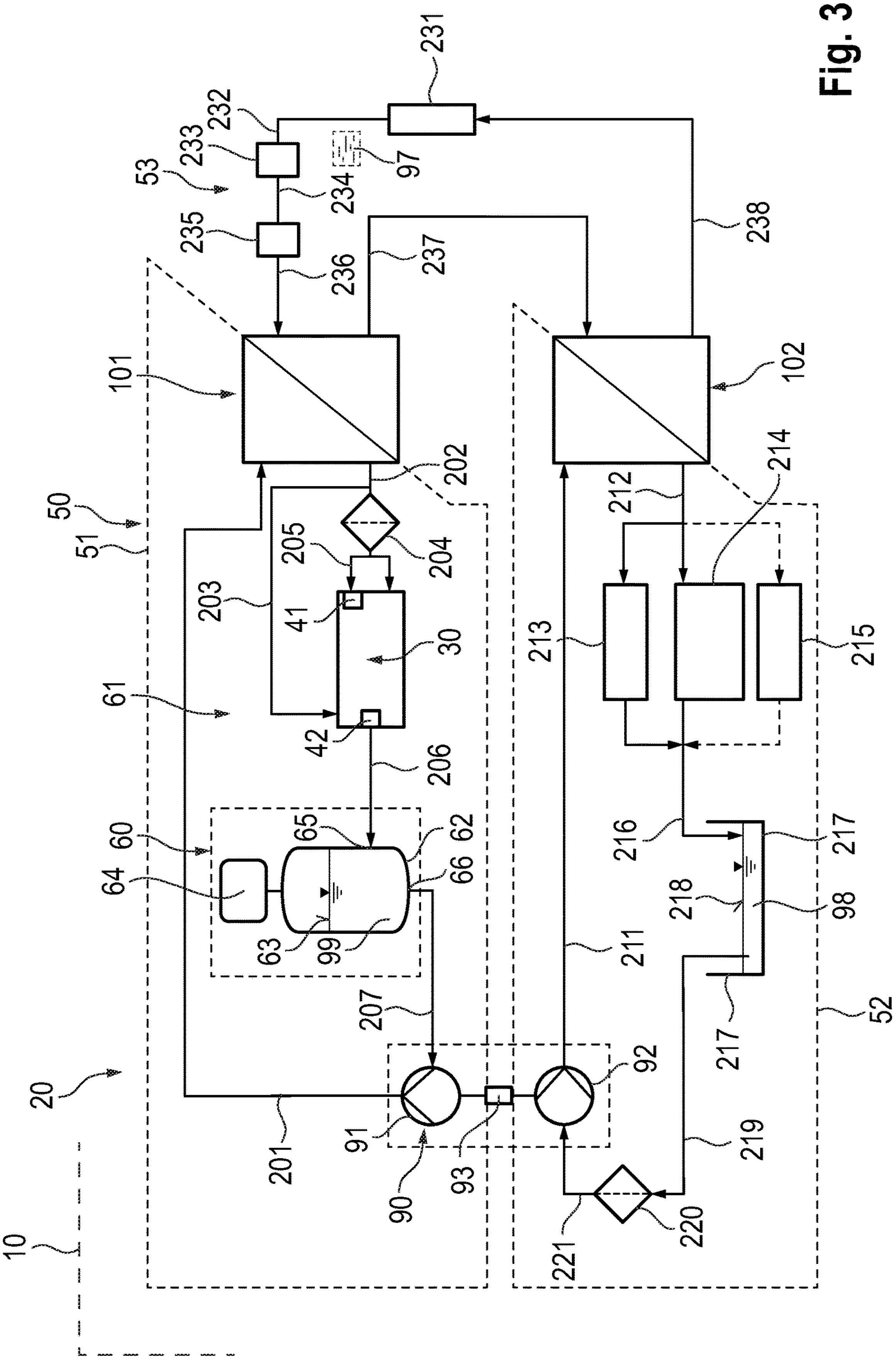
FIG. 3 is a schematic view of a cooling system with the electric motor of FIG. 1 and with an expansion tank.

FIG. 3 shows an electric vehicle 10 having a drive unit 20 in a schematic view. The electric vehicle 10 can be a pure electric vehicle or can be a hybrid electric vehicle.

The drive unit 20 has the electric motor 30 and a cooling system 50.

The cooling system 50 has a first cooling circuit 51, a second cooling circuit 52, and a third cooling circuit 53. A pumping apparatus 90 comprises a first pump 91 and a second pump 92.

In the embodiment example, the first cooling circuit 51 comprises the first pump 91 connected to a heat exchanger 101 via a conduit 201, and the heat exchanger 101 is connected on the one hand to a filter 204 via a conduit 202 and connected on the other hand to the electric motor 30 with a conduit 203.

The filter 204 is connected to the electric motor 30 via a conduit 205. The electric motor 30 is connected to an expansion tank assembly 60 via a conduit 206, and the expansion tank assembly 60 is connected to the first pump 91 via a conduit 207.

In the embodiment example, the conduit 205 is fed to the stator housing inlet 41 of the electric motor 30 and serves to cool the electric motor 30.

The expansion tank assembly 60 has an expansion tank 62 and a pressure equalization assembly 64. The conduit 206 is connected to the expansion tank inlet 65, and the expansion tank outlet 66 is connected to the conduit 207. The expansion tank 62 is partially filled with the coolant 99, and the surface 63 is schematically indicated.

The pressure equalization assembly 64 is configured so as to provide at least an occasional fluidic connection between the expansion tank 62 and the ambient environment 61 of the drive unit 20. This can at least in part cause a pressure equalization between the expansion tank 62 and the ambient environment 61. The ambient environment 61 in the case of an electric vehicle 10 is the atmosphere, i.e. air with normal ambient air pressure, typically moisture, and possibly dirt particles such as dust and oils.

The second pump 92 is connected to a heat exchanger 102 via a conduit 211, and the heat exchanger 102 is connected via a conduit 212 to apparatuses 213, 214, and 215 to be cooled, which include, for example, a transmission or power steering. The apparatuses 213, 214, 215 to be cooled are connected to an oil sump 217 via a conduit 216, which can also be referred to as an oil pan. A coolant 98 for the second coolant circuit 52 is provided in the oil sump 217, the surface of which is schematically indicated 218. The oil sump 217 is connected to a filter 220 via a conduit 219, and the filter 220 is connected to the second pump 92 via a conduit 221.

In the embodiment example, the third coolant circuit 53 comprises a pump 231 connected to a heat exchanger 233 via a conduit 232. The heat exchanger 233 is connected to an apparatus 235 to be cooled via a conduit 234, for example a power electronics such as a pulse inverter, and the apparatus 235 is connected to the heat exchanger 101 via a conduit 236 in order to supply a schematically indicated coolant 97 of the third coolant circuit 53. The heat exchanger 101 is connected to the heat exchanger 102 via a conduit 237, and the heat exchanger 102 is connected to the pump 231 via a conduit 238. The coolant circuit 53 serves to cool the heat exchangers 101 and 102, and heat from the coolants 99 and 98 can be transferred to the coolant 97.

The coolant 97 is preferably a mixture comprising water and glycol.

The coolant 98 is e.g. transmission oil or engine oil, and it can preferably additionally be used for lubrication.

The coolant 99 is used for the direct cooling of the electric motor 30 and is therefore preferably electrically non-conductive or poorly conductive. Preferably, the coolant 99 is a dielectric coolant. Dielectric coolants are advantageous because they are electrically non-conductive or at least poorly conductive and therefore can also be used in the electric motor 30 in order to cool the winding assembly 38. For example, coolant based on monoethylene glycol or based on a mixture of methyl nonafluoro-n-butylether with methyl nonafluoro-iso-butylether, which is sold as a coolant called R-7100, or based on hydrofluoroether, which is sold as a coolant called HFE-7100, are suitable.

Figure 4:
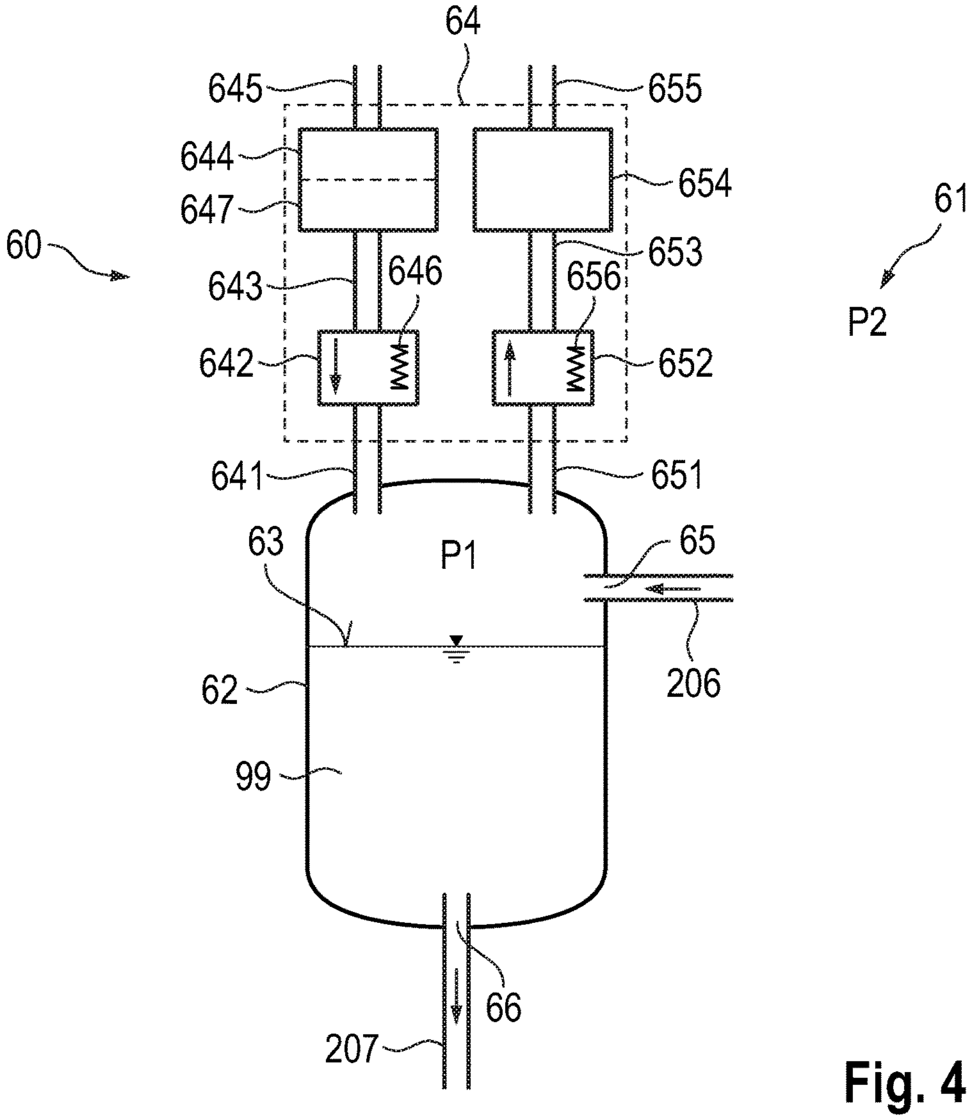
FIG. 4 illustrates the expansion tank of FIG. 3.

FIG. 4 shows the expansion tank assembly 60 of FIG. 3.

The expansion tank 62 is partially filled with the coolant 99, and the surface 63 is schematically indicated. Above the surface 63 is air or a coolant-air mixture with vaporized coolant. In the expansion tank 62, there is a pressure P1 which is in particular dependent on the temperature of the coolant 99 in the cooling circuit 51. In the embodiment example, the pressure equalization assembly 64 comprises a conduit 641 connected to the expansion tank 62 and a further conduit 651 connected to the expansion tank 62.

The conduit 641 is connected to a conduit 643 via a valve 642 and the conduit 643 is connected to a conduit 645 open to the ambient environment 61 via a dehumidification apparatus 644 and a filtering apparatus 647.

The conduit 651 is connected to a conduit 653 via a valve 652. The conduit 653 is connected to a conduit 655 open to the ambient environment 61 via a filter apparatus 654.

The valve 652 is configured so as to transition from a non-conductive state into a conductive state when the pressure P1 in the expansion tank 62 is greater than the pressure P2 in the outside environment 61 by at least a specified first amount B 1. This can at least partially cause a pressure equalization in the expansion tank 62 in case of a corresponding positive pressure. The first amount is not equal to 0, so, in the embodiment example, a differential pressure P1-P2>B1 is required in terms of the amount, wherein the first amount B1 is greater than zero in order to cause a pressure equalization.

The valve 652 in the embodiment example has a schematically suggested spring 656, the spring force of which influences the opening of the valve 652. For example, the valve 652 can be configured as a pressure relief valve having a ball forced against an opening by the spring 656, or a differential pressure meter can be provided, which actuates the controllable valve 652 at a specified pressure differential.

The valve 642 is configured so as to transition from a non-conductive state into a conductive state when the pressure P2 in the ambient environment 61 is greater than the pressure P1 in the expansion tank 62 by at least a specified second amount B2. This at least partially causes a pressure equalization in the expansion tank 62 in case of a negative pressure. The second amount is not equal to 0, so, in the embodiment example, a differential pressure P2−P1>B2 is required in terms of the amount, wherein the second amount B2 is greater than zero in order to cause a pressure equalization.

The valve 642 preferably has a schematically suggested spring 646, and the specified first amount is preferably influenced by the spring force of the second spring 646. The valve 642 can be constructed like the valve 652, wherein the direction of assembly is inverted.

The dehumidification apparatus 644 is configured so as to dehumidify the air entering the expansion tank 62 from the outside environment. This is advantageous, because mixing the coolant 99 with water results in an increase in electrical conductivity. Such a dehumidification apparatus 644 is also referred to as an adsorbent.

The filter apparatus 647 is configured so as to reduce or prevent an entry of dirt, such as dust or oils, into the expansion tank 62 through air entering from the ambient environment 61.

The filter apparatus 654 is configured so as to reduce or prevent a discharge of the coolant 99 into the ambient environment 61. To the extent that coolant 99 comprises, for example, hydrocarbons, they should not enter the ambient environment 61.

The filter apparatus 654 preferably comprises an activated carbon filter.

In the embodiment example, the inlet valve 642 and the outlet valve 652 are connected to the expansion tank 62 via separate conduits 641, 651. Alternatively, the valves 642, 652 can be configured by a common valve which common valve enables an opening or a conductive switching in case of both a positive pressure and a negative pressure in the expansion tank 62. The corresponding apparatuses 644, 647, and 654 can be utilized in both directions. In a further embodiment, the apparatuses 644, 647, and 654 are provided between the associated valves 642, 652 and the expansion tank 62.

Figure 5:
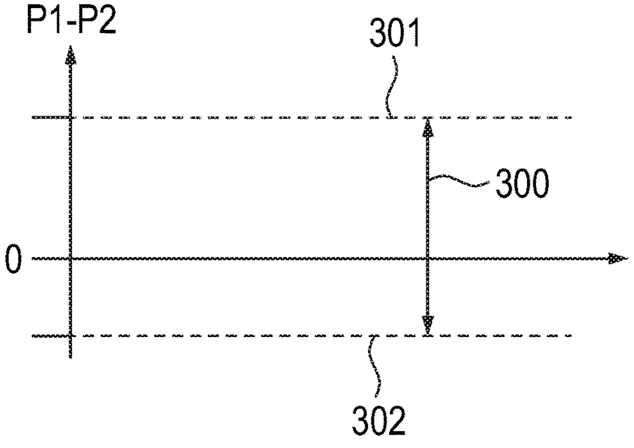
FIG. 5 illustrates a diagram of differential pressures.

FIG. 5 shows a diagram in which the ordinates indicate the differential pressure P2-P1. The line 301 indicates the threshold at which the valve 642 is switched conductively when the pressure P1 in the expansion tank 62 is less than the pressure P2 in the ambient environment 61.

Likewise, the line 302 indicates from what differential pressure P2-P1 the valve 652 conductively switches when the pressure P1 in the expansion tank 62 is greater than the pressure in the ambient environment 61.

In the region 300 between the lines 301 and 302, the valves 642 and 652 are not switched conductively, so no pressure equalization takes place. As a result, the relative pressure in the expansion tank 62 is located in the region 300, and the valves 642, 652 become conductive only when the outer limits 301, 302 are exceeded.

The provision of the region 300 is advantageous, because with smaller temperature fluctuations, the pressure differentials occurring between the pressures P1 and P2 are so low that there is no risk of damage to the coolant circuit 51. If pressure equalization were to take place on an ongoing basis with the pressure differentials in the region 300, this would result in a faster filling of the cleaning apparatuses 644, 647, 654 and thus a required exchange and/or a contamination of the coolant 99. The person skilled in the art refers to a system in which a pressure equalization occurs on an ongoing basis due to pressure fluctuations as a breathing system. Breathing is prevented in the region 300.

On the other hand, the conduits of the coolant circuit 51 can be designed for the maximum differential pressures corresponding to lines 301 and 302, because a substantial excess of these limits is prevented by the pressure equalization assembly 64.

It is possible to not provide the pressure equalization assembly 64 and instead provide a large pressure expansion tank. However, such a pressure expansion tank requires a great deal of space and leads to additional weight. Therefore, the present pressure equalization assembly 64 has proven to be very advantageous.

Many variants and modifications are of course possible within the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A drive unit for an electric vehicle, comprising:

an electric motor for propulsion;

a cooling system, wherein the electric motor comprises a stator assembly and a rotor assembly, wherein the stator assembly comprises a stator housing, a stator core having grooves, and a winding assembly, wherein the winding assembly extends through the grooves, wherein the stator housing comprises a stator housing inlet and a stator housing outlet, wherein the grooves are fluidically connected to the stator housing inlet and the stator housing outlet, wherein the cooling system comprises a first cooling circuit, which is connected to the stator housing inlet and the stator housing outlet so as to enable a direct cooling of the winding assembly, wherein the first cooling circuit comprises an expansion tank assembly, the expansion tank assembly comprising an expansion tank, at least one expansion tank inlet, one expansion tank outlet, and a pressure equalization assembly, the pressure equalization assembly including an activated carbon filter configured to reduce or prevent a discharge of the coolant into the ambient environment, wherein the expansion tank is connected to the first cooling circuit via the at least one expansion tank inlet and the expansion tank outlet, wherein the pressure equalization assembly is configured to enable, at least temporarily, a fluidic connection between the expansion tank and an ambient environment of the drive unit, in order to at least partially cause a pressure equalization between the expansion tank and the ambient environment, and wherein the pressure equalization assembly comprises a first valve configured to transition from a non-conductive state into a conductive state when a pressure in the ambient environment is greater than a pressure in the expansion tank by at least a specified first amount in order to at least partially cause a pressure equalization in case of a negative pressure in the expansion tank, wherein the specified first amount is not equal to zero;

a second cooling circuit;

a pumping apparatus; and a third cooling circuit, wherein the pumping apparatus comprises a first pump and a second pump, wherein the first pump is configured to convey a first coolant in the first cooling circuit, wherein the second pump is configured to convey a second coolant in the second cooling circuit, wherein the first coolant and the second coolant are different, wherein the first cooling circuit comprises a first heat exchanger and the second cooling circuit comprises a second heat exchanger, and wherein the third cooling circuit is configured to cool the first heat exchanger and the second heat exchanger.

2. The drive unit according to claim 1, wherein the first coolant is a dielectric coolant.

3. The drive unit according to claim 1, wherein the pressure equalization assembly comprises a second valve configured to transition from a non-conductive state into a conductive state when a pressure in the expansion tank is greater than a pressure in the ambient environment by at least a specified second amount in order to at least partially cause the pressure equalization in case of a positive pressure in the expansion tank, wherein the specified second amount is not equal to zero.

4. The drive unit according to claim 3, wherein the second valve comprises a second spring, and wherein the specified second amount is influenced by a spring force of the second spring.

5. The drive unit according to claim 1, wherein the first valve comprises a first spring, and wherein the specified first amount is influenced by a spring force of the first spring.

6. The drive unit according to claim 1, wherein the pressure equalization assembly comprises a dehumidification apparatus configured to perform a dehumidification of air entering the expansion tank from the ambient environment.

7. The drive unit according to claim 1, wherein the pressure equalization assembly comprises a second filter apparatus configured to reduce or prevent an entry of dirt through air entering the expansion tank from the ambient environment.

8. An electric vehicle having the drive unit according to claim 1.

9. The drive unit according to claim 1, wherein the third cooling circuit includes a third cooling circuit pump, a pulse inverter, and a pulse inverter heat exchanger.

10. The drive unit according to claim 9, wherein the third cooling circuit is configured to circulate a third coolant, and wherein the third coolant is different from the first coolant and the second coolant.

11. The drive unit according to claim 10, wherein the first coolant is a dielectric coolant, wherein the second coolant is transmission oil or engine oil, and wherein the third coolant is a mixture comprising water and glycol.

12. The drive unit according to claim 1, wherein the first cooling circuit is configured to circulate the first coolant sequentially from the first heat exchanger to the electric motor, from the electric motor to the expansion tank, from the expansion tank to the first pump, and from the first pump to the first heat exchanger.

13. The drive unit according to claim 12, wherein the second cooling circuit is configured to circulate the second coolant sequentially from the second heat exchanger to a transmission and/or a power steering, from the transmission and/or the power steering to an oil sump, from the oil sump to a filter, from the filter to the second pump, and from the second pump to the second heat exchanger.

14. The drive unit according to claim 1, wherein the first heat exchanger is configured to transfer heat between the first cooling circuit and the third cooling circuit and to keep the first cooling circuit and the third cooling circuit fluidically separate, and wherein the second heat exchanger is configured to transfer heat between the second cooling circuit and the third cooling circuit and to keep the second cooling circuit and the third cooling circuit fluidically separate.

15. A drive unit for an electric vehicle, comprising:

an electric motor for propulsion;

a cooling system, wherein the electric motor comprises a stator assembly and a rotor assembly, wherein the stator assembly comprises a stator housing, a stator core having grooves, and a winding assembly, wherein the winding assembly extends through the grooves, wherein the stator housing comprises a stator housing inlet and a stator housing outlet, wherein the grooves are fluidically connected to the stator housing inlet and the stator housing outlet, wherein the cooling system comprises a first cooling circuit, which is connected to the stator housing inlet and the stator housing outlet so as to enable a direct cooling of the winding assembly, wherein the first cooling circuit comprises an expansion tank assembly, the expansion tank assembly comprising an expansion tank, at least one expansion tank inlet, one expansion tank outlet, and a pressure equalization assembly, wherein the expansion tank is connected to the first cooling circuit via the at least one expansion tank inlet and the expansion tank outlet, wherein the pressure equalization assembly is configured to enable, at least temporarily, a fluidic connection between the expansion tank and an ambient environment of the drive unit, in order to at least partially cause a pressure equalization between the expansion tank and the ambient environment, and wherein the pressure equalization assembly comprises a first valve configured to transition from a non-conductive state into a conductive state when a pressure in the ambient environment is greater than a pressure in the expansion tank by at least a specified first amount in order to at least partially cause a pressure equalization in case of a negative pressure in the expansion tank, wherein the specified first amount is not equal to zero;

a second cooling circuit;

a pumping apparatus; and a third cooling circuit, wherein the pumping apparatus comprises a first pump and a second pump, wherein the first pump is configured to convey a first coolant in the first cooling circuit, wherein the second pump is configured to convey a second coolant in the second cooling circuit, wherein the first coolant and the second coolant are different, wherein the first cooling circuit comprises a first heat exchanger and the second cooling circuit comprises a second heat exchanger, wherein the third cooling circuit is configured to cool the first heat exchanger and the second heat exchanger, and wherein the third cooling circuit includes a third cooling circuit pump, a pulse inverter, and a pulse inverter heat exchanger.

16. The drive unit according to claim 15, wherein the third cooling circuit is configured to circulate a third coolant, and wherein the third coolant is different from the first coolant and the second coolant.

17. The drive unit according to claim 16, wherein the first coolant is a dielectric coolant, wherein the second coolant is transmission oil or engine oil, and wherein the third coolant is a mixture comprising water and glycol.

18. A drive unit for an electric vehicle, comprising:

an electric motor for propulsion;

a cooling system, wherein the electric motor comprises a stator assembly and a rotor assembly, wherein the stator assembly comprises a stator housing, a stator core having grooves, and a winding assembly, wherein the winding assembly extends through the grooves, wherein the stator housing comprises a stator housing inlet and a stator housing outlet, wherein the grooves are fluidically connected to the stator housing inlet and the stator housing outlet, wherein the cooling system comprises a first cooling circuit, which is connected to the stator housing inlet and the stator housing outlet so as to enable a direct cooling of the winding assembly, wherein the first cooling circuit comprises an expansion tank assembly, the expansion tank assembly comprising an expansion tank, at least one expansion tank inlet, one expansion tank outlet, and a pressure equalization assembly, wherein the expansion tank is connected to the first cooling circuit via the at least one expansion tank inlet and the expansion tank outlet, wherein the pressure equalization assembly is configured to enable, at least temporarily, a fluidic connection between the expansion tank and an ambient environment of the drive unit, in order to at least partially cause a pressure equalization between the expansion tank and the ambient environment, and wherein the pressure equalization assembly comprises a first valve configured to transition from a non-conductive state into a conductive state when a pressure in the ambient environment is greater than a pressure in the expansion tank by at least a specified first amount in order to at least partially cause a pressure equalization in case of a negative pressure in the expansion tank, wherein the specified first amount is not equal to zero;

a second cooling circuit;

a pumping apparatus; and a third cooling circuit, wherein the pumping apparatus comprises a first pump and a second pump, wherein the first pump is configured to convey a first coolant in the first cooling circuit, wherein the second pump is configured to convey a second coolant in the second cooling circuit, wherein the first coolant and the second coolant are different, wherein the first cooling circuit comprises a first heat exchanger and the second cooling circuit comprises a second heat exchanger, wherein the third cooling circuit is configured to cool the first heat exchanger and the second heat exchanger, and wherein the first cooling circuit is configured to circulate the first coolant sequentially from the first heat exchanger to the electric motor, from the electric motor to the expansion tank, from the expansion tank to the first pump, and from the first pump to the first heat exchanger.

19. The drive unit according to claim 18, wherein the second cooling circuit is configured to circulate the second coolant sequentially from the second heat exchanger to a transmission and/or a power steering, from the transmission and/or the power steering to an oil sump, from the oil sump to a filter, from the filter to the second pump, and from the second pump to the second heat exchanger.

* * * * *